United States Patent [19]
Kann et al.

[11] Patent Number: 4,828,198
[45] Date of Patent: May 9, 1989

[54] ROLL SUPPORT SPINDLE

[76] Inventors: Frederick P. Kann, 36 Tindara Dr., Sawtell, New South Wales, Australia, 2452; James L. Small, 72 Cheryl Crescent, Newport, New South Wales, Australia, 2106

[21] Appl. No.: 96,605
[22] Filed: Sep. 11, 1987
[51] Int. Cl.⁴ .............................................. B65H 75/24
[52] U.S. Cl. ................................... 242/72 B; 279/2 A
[58] Field of Search ................... 242/72 B, 72 R, 47.4; 279/2 A, 2 R

[56] References Cited
U.S. PATENT DOCUMENTS

| | | | |
|---|---|---|---|
| 2,630,278 | 3/1953 | Herman | 242/72 B |
| 3,127,124 | 3/1964 | Tidland et al. | 242/72 B |
| 3,825,167 | 7/1974 | Komorek . | |
| 4,253,694 | 3/1981 | Walter et al. | 279/2 A |
| 4,436,252 | 3/1984 | Burkie . | |
| 4,461,430 | 7/1984 | Lever | 242/72 B |
| 4,771,963 | 9/1988 | Gattrugeri | 242/72 B |

Primary Examiner—Stuart S. Levy
Assistant Examiner—Steven M. duBois
Attorney, Agent, or Firm—Ladas & Parry

[57] ABSTRACT

A roll support spindle having a longitudinally extending peripheral surface at which there is mounted a series of expandable elastomeric membranes which are expanded by fluid under pressure to engage the roll.

4 Claims, 1 Drawing Sheet

ROLL SUPPORT SPINDLE

TECHNICAL FIELD

This invention relates to an improved roll support spindle and has been devised particularly though not solely for the support of rolls of continuous material during any process requiring rotation of the roll.

BACKGROUND ART

There are many situations where it is desired to support a roll or reel of continuous sheet material such as paper, plastic film or foil material, either for dispensing of material from the roll or for winding onto the roll. Such rolls commonly have tubular cores formed, for example, from paper, plastic or metal tubing and are generally supported for rotation on a spindle in the apparatus concerned. The roll is supported on the spindle in a number of different ways, depending on the application. For example, the spindle may be provided with cones at either end thereof, one cone being fixed and the other cone being axially movable to support the roll between the cones in a wedging action and centralise the roll on the spindle. Other forms of support spindles have been provided with a number of longitudinal slats having studs protruding inwardly therefrom through the wall of the support spindle to a central actuating device adapted to move the slats outwardly and, hence, increase the circumference of the support spindle to lock the core thereon. Yet another form uses a rotationally cast membrane of elastomeric material such as polyurethane.

Repairs to rotationally cast polyurethane membranes are almost impossible to effect and have to be returned to the original manufacturer for a complete recast. Another disadvantage with this type of spindle is that a standard cannot be established because of the variation of the wall thickness of the support spindle, which has to be either increased or decreased depending on load factors and therefore affecting the elastic properties of the membrane.

The known methods of mounting a roll onto a spindle are either complex and, therefore, expensive to manufacture and prone to breakdown in use, or are cumbersome and time consuming to use, requiring considerable operator effort and taking up valuable process time.

It is therefore the object of the present invention to provide an improved roll support spindle which will obviate or minimise the foregoing disadvantages in a simple yet effective manner, or which will at least provide the public with a useful choice.

DISCLOSURE OF INVENTION

There is disclosed herein a roll support spindle comprising an axle body adapted to be rotatably supported for rotation about the longitudinal axis of the body, said body having a longitudinally extending peripheral surface about which the roll is to be located, a passage in said body and extending from an inlet to which a fluid under pressure is delivered, a plurality of ducts extending from said passage to said peripheral surface, a plurality of extendable means mounted on said body, with each extendable means being operatively associated with one of said ducts, and wherein said extendable means are movable from a retracted position to an extended position by said fluid under pressure so as to securely engage said roll.

BRIEF DESCRIPTION OF DRAWINGS

A preferred form of the present invention will now be described by way of example with reference to the accompanying drawings, wherein.

MODES FOR CARRYING OUT THE INVENTION

Figure 2:
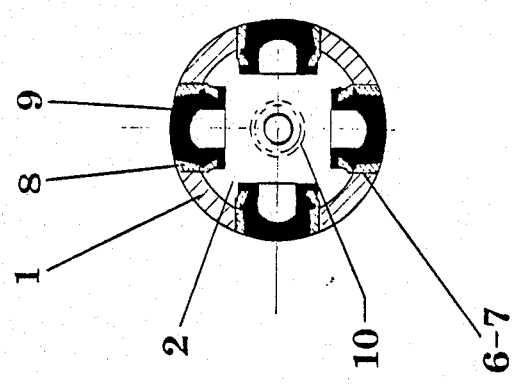
FIG. 2 is a transverse cross-section on line A—A of FIG. 1, deflated and with core removed.
Figure 1:
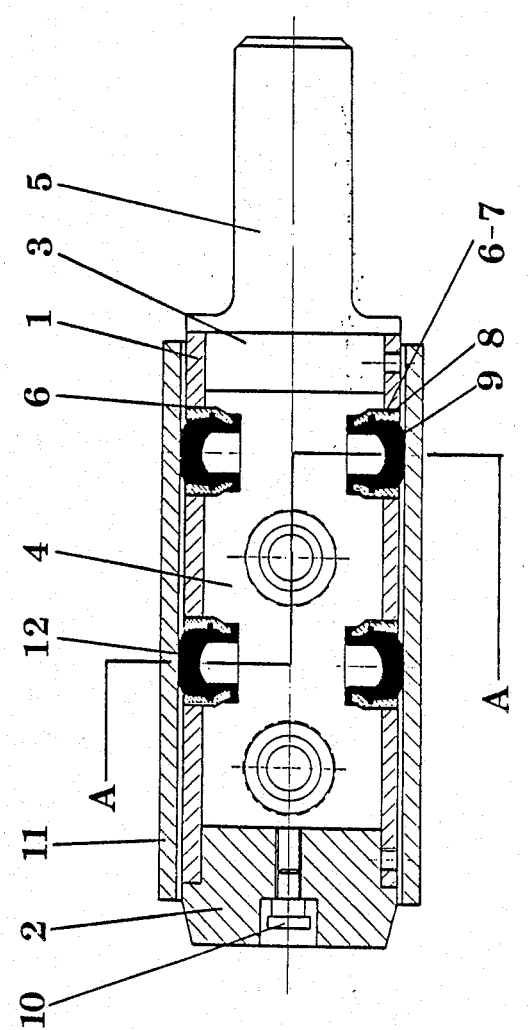
FIG. 1 is a longitudinal cross-section through an inflated roll support spindle.

In the preferred form of the invention, a short roll support spindle adapted to be cantilevered from a single set of bearings is constructed as follows, although it will be appreciated that the spindle may be made of any desired length and may be supported by bearings at either end thereof.

The roll support spindle comprises a hollow tubular axle 1 in which is inserted end plugs 2 and 3. The end plugs form a fluid-tight chamber 4 within the hollow tubular axle. The roll support spindle is adapted to be rotatably supported by suitable bearings and is conveniently provided with a journal 5 which may form an extension of the end plug 3. In the alternative any other suitable form of bearing support may be provided.

A plurality of circular apertures 6 are formed in the circumferential wall of the hollow tubular axle 1, equispaced around the circumference of the axle. The circular apertures 6 are provided with a suitable standard screw thread 7.

An externally threaded hollow plug 8 containing an extendable member in the form of an elastomeric moulded membrane 9 is screwed into the circular apertures 6 and sealed with a suitable sealant, forming a fluid tight chamber 4.

The threaded plug 8 and the elastomeric membrane 9 are then machined so as to finish flush with the outside diameter of the hollow tubular axle 1.

The end plug 2 is provided with a fluid supply means adapted to pressurize the interior of the hollow tubular axle 1 causing the elastomeric membrane 9 to expand outwardly through the hollow plug 8.

In the preferred form of the invention, the fluid supply means comprises an air supply and release valve 10 axially located in the end plug 2.

In use when it is desired to support a roll of material on the roll support spindle according to the invention, the roll core 11 is engaged over the roll support spindle until it is positioned in the desired axial location. Compressed air is then supplied through the valve 10 into the interior chamber 4 causing the elastomeric membrane 9 to expand outwardly through the hollow plugs 8 as shown at 12. The expanded elastomeric membrane automatically centralises the roll core 11 on the roll support spindle and securely holds the roll core locked tightly in place on the spindle ready for rotation.

Once the material has been exhausted from the roll core, air pressure is released from the chamber 4 through the valve 10 allowing the elastomeric membrane to return to its normal position flush with the outer surface of the tubular axle 1 allowing the roll core 11 to be simply removed from the roll support spindle.

In this manner, a roll support spindle is provided which is simple and economical to manufacture, reliable in use, easily maintained, and which enables an operator to quickly and simply engage or remove a roll core from the spindle.

What we claim is:

1. A roll support spindle comprising a hollow body that can be rotatably supported for rotation about a longitudinal axis of the body, said body having a longitudinally extending peripheral surface about which a roll is to be located; a passage in said body, extending from an inlet, to which a fluid under pressure can be delivered; a plurality of ducts extending from said passage to said peripheral surface; at least one extendable means connectable to said body, each extendable means having a resilient portion that communicates with said passage so that said resilient portion is movable from a retracted position to an extended position by said fluid under pressure so as to securely engage said roll, each resilient portion being an elastomeric membrane that is extendable radially outward relative to said longitudinal axis; and a mounting portion engagable with said body and stationary relative to said resilient portion, each mounting portion having a generally cylindrical shape and being threaded so as to be received by a threaded portion of the duct.

2. The roll support spindle of Claim 1 wherein said body is provided with end plugs to sealingly close said passage apart from said inlet.

3. The roll support spindle of claim 2 wherein said inlet is provided with a valve to retain said fluid under pressure within said passage.

4. The roll support spindle of claima 3 wherein said ducts are equally angularly spaced about said axis and are located at spaced positions longitudinally of said axis.

* * * * *